No. 613,834.  
W. BURNET.  
LAWN MOWER.  
(Application filed Feb. 17, 1897.)  
Patented Nov. 8, 1898.

(No Model.)

Witnesses  
E. C. Wurdeman  
H. Williamson

Inventor  
William Burnet  
by Geo. H. Holgate  
Attorney

UNITED STATES PATENT OFFICE.

WILLIAM BURNET, OF SAN FRANCISCO, CALIFORNIA.

LAWN-MOWER.

SPECIFICATION forming part of Letters Patent No. 613,834, dated November 8, 1898.

Application filed February 17, 1897. Serial No. 623,804. (No model.)

*To all whom it may concern:*

Be it known that I, WILLIAM BURNET, a citizen of the United States, residing at San Francisco, in the county of San Francisco and State of California, have invented a certain new and useful Improvement in Lawn-Mowers, of which the following is a specification.

My invention relates to improvements in lawn-mowers, and has for its object to provide novel, simple, and efficient means whereby the grass is cut and gathered at a single operation.

With these ends in view the invention consists in the details of construction and combination of elements hereinafter set forth and claimed.

In order that those skilled in the art to which this invention appertains may understand how to make and use the same, the construction and operation will now be described in detail, reference being had to the accompanying drawings, forming part of this specification, in which—

Figure 1:
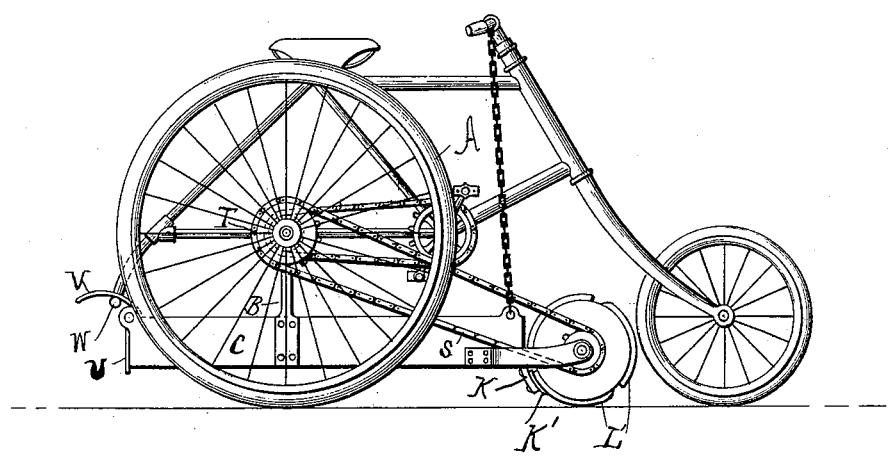
Figure 2:
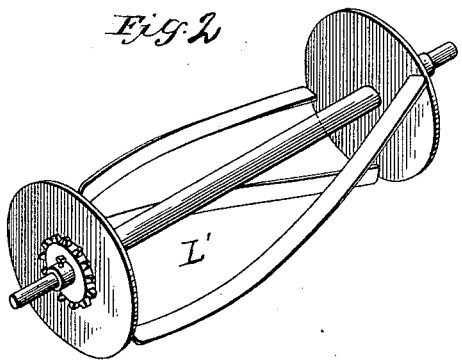

Figure 1 is a side elevation of a tricycle having my improvement attached thereto. Fig. 2 is a perspective view of the cutter.

In carrying out my invention I provide a tricycle A, which may be of ordinary construction or especially designed for this purpose, and by depending rods B the receptacle C is attached in such a manner that the rods may be pivoted to the axle.

To the front of the receptacle is journaled the cutter L'. A sprocket-wheel T is secured upon the same shaft with the rear wheel of the tricycle and has run thereover the sprocket-chain S, connected with a sprocket-wheel of the cutter-axle, while the cranks and their sprocket-wheel are connected to the rear shaft in the usual manner.

An apron K is secured in front of the receptacle, and to it is secured a stationary cutting-bar K'. Thus it will be seen that as the grass is cut it will be thrust within the receptacle C and there retained until conveyed to a suitable locality, thus avoiding the necessity of raking the lawn, which often injures the roots of the grass.

An end gate U is provided with a curved rod V, which projects over the hook W, and as the forward end of the receptacle is elevated the end of the gate is opened to allow the grass to be withdrawn.

I am aware that various forms of apparatus embodying my general principle may be designed, and I do not wish to limit myself to the exact form shown and described.

Having thus fully described this invention, what is claimed as new and useful is—

1. In combination, a tricycle, a receptacle pivoted thereto, an apron carried by said receptacle, a rotary cutter journaled with brackets projecting from the receptacle, means for rotating said cutter from the drive-wheel of the machine, an end gate pivoted to the receptacle, means whereby lifting the front end of the receptacle opens the gate, and means for elevating the front end, substantially as and for the purpose set forth.

2. In combination, a tricycle, a receptacle suspended therefrom, an apron carried by the front end of said receptacle, a rotary cutter journaled within brackets projecting from the front end of the receptacle, a drive-chain running over suitable sprockets for rotating said cutter, an end gate pivoted to the rear of the receptacle, a curved rod projecting from said gate, and a hook for operating upon said rod to open the gate when the rear end of the receptacle is depressed, as specified.

In testimony whereof I have hereunto affixed my signature in the presence of two subscribing witnesses.

WILLIAM BURNET.

Witnesses:
S. S. WILLIAMSON,
L. SONNTAG.